United States Patent
Mitani

(10) Patent No.: US 9,176,695 B2
(45) Date of Patent: Nov. 3, 2015

(54) IMAGE FORMING APPARATUS, PRINTING SYSTEM, PRINT SETTING APPARATUS, AND IMAGE FORMING METHOD

(75) Inventor: Masateru Mitani, Shizuoka-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 607 days.

(21) Appl. No.: 13/039,512

(22) Filed: Mar. 3, 2011

(65) Prior Publication Data
US 2011/0216330 A1  Sep. 8, 2011

Related U.S. Application Data

(60) Provisional application No. 61/310,937, filed on Mar. 5, 2010.

(51) Int. Cl.
  *G06F 15/00* (2006.01)
  *G06F 3/12* (2006.01)

(52) U.S. Cl.
  CPC ............ *G06F 3/1285* (2013.01); *G06F 3/1205* (2013.01); *G06F 3/1208* (2013.01); *G06F 3/1254* (2013.01)

(58) Field of Classification Search
  CPC .... G06F 3/1205; G06F 3/1285; G06F 3/1254
  USPC ........................................................ 358/1.2
  See application file for complete search history.

(56) References Cited

U.S. PATENT DOCUMENTS

| 6,857,798 | B2 | 2/2005 | Matsuyama |
| 7,551,310 | B2 * | 6/2009 | Yudasaka et al. ............ 358/1.18 |
| 2005/0050119 | A1 * | 3/2005 | Vandanapu .................... 708/207 |
| 2009/0303499 | A1 | 12/2009 | Kang et al. |

FOREIGN PATENT DOCUMENTS

| EP | 0 971 532 A2 | 1/2000 |
| JP | 2005-050119 | 2/2005 |

OTHER PUBLICATIONS

European Search Report for Application No. 11155626.2-1959/2363796 Dated Apr. 5, 2013, 42 pgs.

* cited by examiner

*Primary Examiner* — Saeid Ebrahimi Dehkordy
(74) *Attorney, Agent, or Firm* — Amin, Turocy & Watson, LLP

(57) ABSTRACT

Provided is an image forming apparatus including: an acquisition unit that acquires size information regarding a sheet on which an image is to be formed and print data; an image forming unit that forms the image on the sheet on the basis of the print data acquired by the acquisition unit; and a control unit that, if the size information acquired by the acquisition unit indicates a first size of which an aspect ratio of the sheet is 1:substantially 1.41, exchanges vertical and horizontal directions of the image formed on the sheet with respect to the print data by controlling the image forming unit so as to execute a first split print mode of enlarging the image to be printed on two sheets.

2 Claims, 7 Drawing Sheets

PRINT DATA → EXCHANGING VERTICAL AND HORIZONTAL DIRECTIONS DURING IMAGE FORMATION WITH RESPECT TO SHEET → PRINTING BASED ON 1X2 MODE

IMAGE FORMING APPARATUS, PRINTING SYSTEM, PRINT SETTING APPARATUS, AND IMAGE FORMING METHOD

CROSS-REFERENCE TO RELATED APPLICATION

This application is also based upon and claims the benefit of priority from U.S. provisional application 61/310,937, filed on Mar. 5, 2010; the entire contents of which are incorporated herein by reference.

FIELD

The present invention relates to an image forming apparatus having a function of enlarging print data to be printed on a plurality of sheets.

BACKGROUND

Image forming apparatuses having a "poster printing function" of enlarging print data to be printed on a plurality of sheets are known. In this kind of image forming apparatus, the suppression of the generation of blanks on the upper, lower, left, and right sides of a sheet during printing is required.

DETAILED DESCRIPTION

A printing system according to this embodiment includes: a print setting apparatus that generates size information regarding a sheet on which an image is to be formed and print data; and an image forming apparatus which includes an acquisition unit that acquires the size information and the print data transmitted from the print setting apparatus, an image forming unit that forms the image on the sheet on the basis of the print data acquired by the acquisition unit, and a control unit that, if the size information acquired by the acquisition unit indicates a first size of which an aspect ratio of the sheet is 1:1.41, exchanges vertical and horizontal directions of the image formed on the sheet with respect to the print data by controlling the image forming unit so as to execute a first split print mode of enlarging the image to be printed on two sheets.

A print setting apparatus according to this embodiment includes: a first display unit that displays a first selection screen to select a size of a sheet on which an image is to be formed; a determination unit that determines whether or not the size of the sheet selected using the first selection screen is a first size of which an aspect ratio is 1:1.41; a second display unit that displays a second selection screen to select any split print mode from among a plurality of the split print modes which are modes of splitting and enlarging an image to be printed on a plurality of sheets and are distinguished by the number of sheets; and a display control unit that, if the size of the sheet selected using the first selection screen is the first size, exchanges vertical and horizontal directions of the image formed on the sheet with respect to print data and displays the second selection screen including a selection screen to select the first split print mode of enlarging the image to be printed on two sheets on the second display unit, and if the size of the sheet selected using the first selection screen is a second size other than the first size, displays the second selection screen without the selection screen to select the first split print mode on the second display unit.

Figure 1:
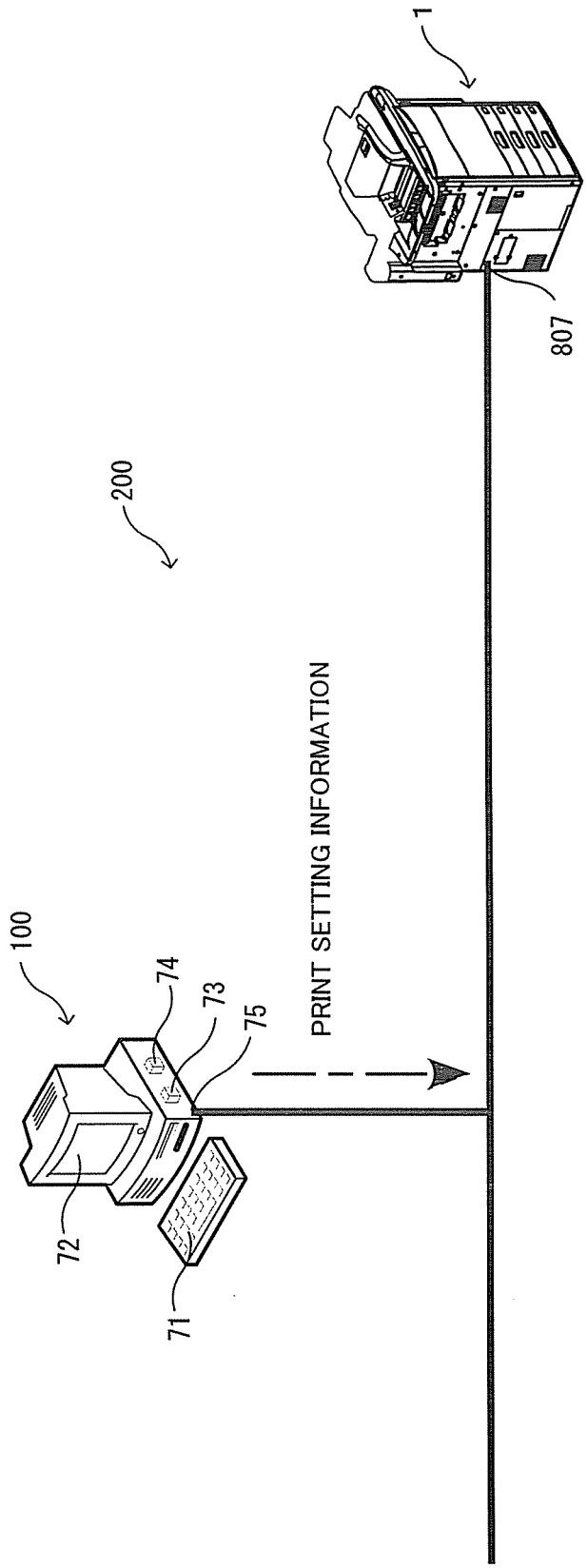
FIG. 1 is a diagram illustrating a network configuration of a printing system.

FIG. 1 illustrates a network configuration of a printing system according to this embodiment. A printing system 200 includes an image forming apparatus 1 and a print setting apparatus 100. The image forming apparatus 1 and the print setting apparatus 100 are connected to each other via a network. The network may be a LAN (Local Area Network) or a WAN (Wide Area Network).

The print setting apparatus 100 includes a keyboard 71, a display screen 72, a controller 73, a storage unit 74, and a transmitting unit 75. The controller 73 reads programs for setting print setting information from the storage unit 74 and executes the programs. The controller 73 may be at least one CPU or MPU. The controller 73 may also be an ASIC circuit for executing at least a part of processes executed by the CPU or MPU on the circuit. The storage unit 74 may be a RAM (Random Access Memory), ROM (Read Only Memory), DRAM (Dynamic Random Access Memory), or SRAM (Static Random Access Memory). The transmitting unit 75 transmits various kinds of information to the image forming apparatus 1 via the network.

Figure 2:
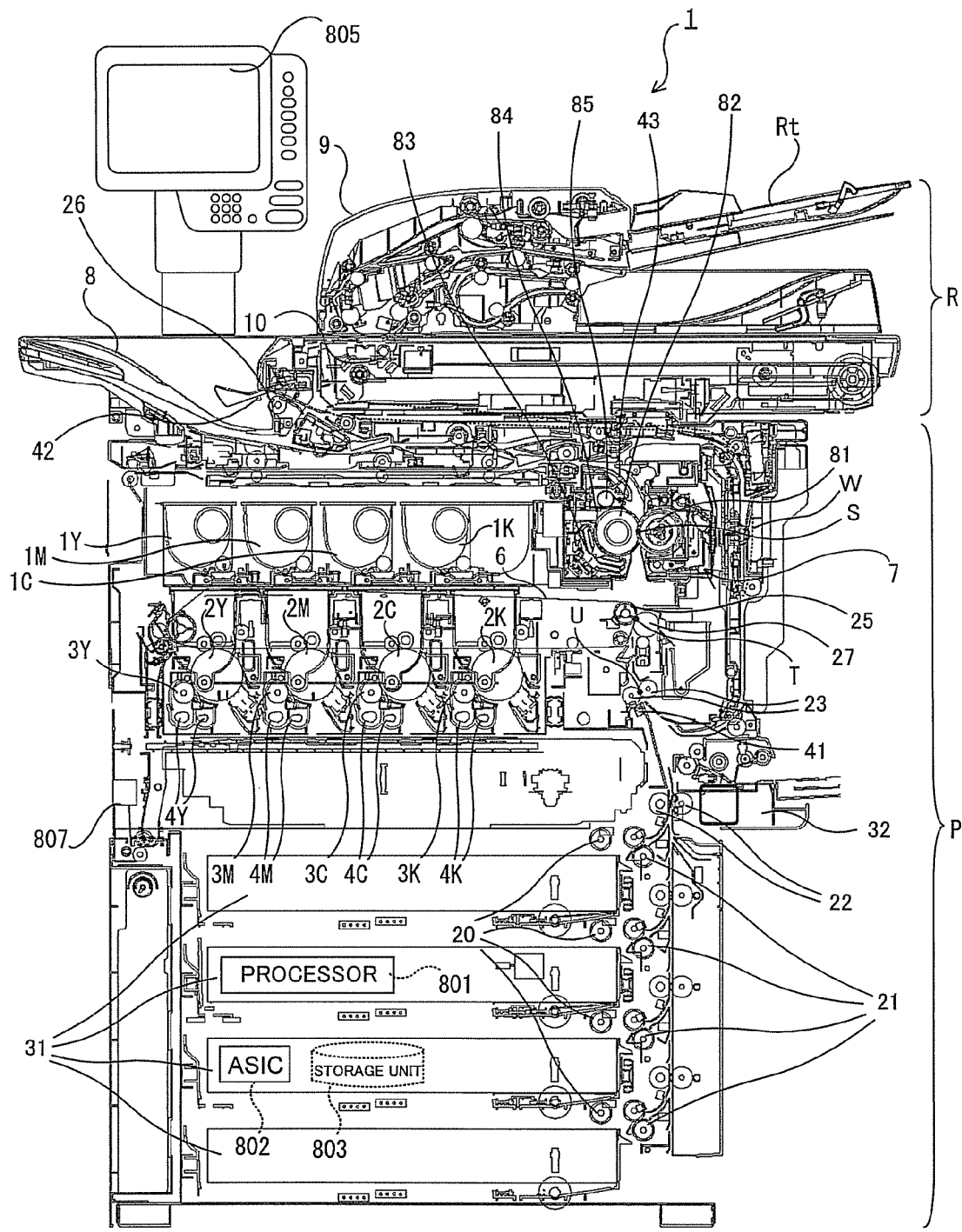
FIG. 2 is a cross-sectional view of an image forming apparatus.

Referring to FIG. 2, the image forming apparatus 1 will be described in detail. FIG. 2 is a cross-sectional view of the image forming apparatus according to the embodiment. Referring to FIG. 2, the image forming apparatus 1 includes an image reading unit R and an image forming unit P. The image reading unit R scans a sheet document or a book document to read images thereof.

The image forming unit P forms a developer image on the sheet on the basis of the image read from the original document by the image reading unit R or print data transmitted to the image forming apparatus 1 from an external device.

The image reading unit R includes an automatic document feeder (ADF) 9 which automatically carries original documents to a predetermined image reading position, and reads an image of the original document which is automatically carried by the automatic document feeder 9 and placed on an original document tray Rt or an original document placed on a platen using a scanning optical system 10.

The image forming unit P includes toner cartridges 1Y to 1K, photoconductors 2Y to 2K, developing rollers 3Y to 3K, mixers 4Y to 4K, an intermediate transfer belt 6, a fixing apparatus 7, cassette trays 31, a manual feed tray 32, and a discharge tray 8.

There is a plurality of the cassette trays 31, and sheets with different sizes are loaded on the corresponding cassette trays 31. The sheets placed on the cassette trays 31 are picked up by pickup rollers 20 one by one. The sheet picked up by the pickup roller 20 is carried to a registration roller 23 as first and second carrying rollers 21 and 22 are rotated.

The registration roller 23 corrects the slope of a sheet which is directed to a secondary transfer position T at which the intermediate transfer of toner is performed by the intermediate transfer belt 6. Specifically, the slope of the sheet is corrected as the sheet abuts the registration roller 23.

A registration sensor 41 senses the size of the sheet that abuts the registration roller 23. The sensing method may be an optical type. The registration sensor 41 is turned on when a sheet is sensed and is turned off when a sheet is not sensed. Therefore, by counting the time for which the registration sensor 41 is turned on, the size of the sheet in the carriage direction is specified.

The fixing apparatus 7 includes a pressurizing roller 81, a heating roller 82, a heating unit 83, a heating belt 84, and a stretching roller 85. The pressurizing roller 81 is rotated while contacting the heating belt 84. The heating roller 82, the heating belt 84, and the stretching roller 85 are rotated along the pressurizing roller 81. The heating unit has a coil and a magnetic flux is generated by a high-frequency current applied to the coil. The magnetic flux generated by the heating unit 83 induces an eddy-current to the heating belt 84 such that the heating belt 84 generates heat. A fixing sensor 43 senses a sheet passing through a nip portion between the pressurizing roller 81 and the heating roller 82. The detecting method may be an optical type.

A discharge roller 26 discharges the sheet onto which a toner image is fixed by the fixing apparatus 7 to the discharge tray 8. The sheet discharged from the discharge roller 26 is detected by a discharge sensor 42.

In addition, the image forming apparatus 1 according to this embodiment includes a processor 801, an ASIC circuit 802, a storage unit 803, an operation display unit 805, and a communication unit 807.

The processor 801 has a role of performing various processes of the image forming apparatus 1 and also has a role of realizing various functions by executing programs stored in the storage unit 803. The processor 801 may be a CPU or an MPU. In addition, the processor 801 may include the ASIC circuit 802. In this case, at least a part of processes realized by the processor 801 is executed by the ASIC circuit 802 in the circuit. The storage unit 803 may be, for example, a RAM (Random Access Memory), ROM (Read Only Memory), DRAM (Dynamic Random Access Memory), or SRAM (Static Random Access Memory). In addition, the storage unit 803 stores programs needed for executing a flowchart described later.

The operation display unit 805 displays various settings. The operation display unit 805 may be an LCD (Liquid Crystal Display), EL (Electronic Luminescence), PDP (Plasma Display Panel), or CRT (Cathode Ray Tube).

Various settings are changed by operating the operation display unit 805. The operation display unit 805 may be a touch panel type.

The communication unit 807 receives a signal transmitted from a PC in which a printer driver is mounted.

Hereinafter, an overview of a copying process as an example of the process performed in the image processing apparatus according to this embodiment will be described.

First, the sheet picked up from the cassette tray 31 by the pickup roller 20 is carried to the registration roller 23 as the first and second carrying rollers 21 and 22 are rotated.

In addition, images of a plurality of sheet original documents continuously and automatically carried by the automatic document feeder 9 are read by the scanning optical system 10 at a predetermined image reading position.

Next, on the basis of print data on the images read from the original documents by the image reading unit R, electrostatic latent images are formed on photoconductive surfaces of the photoconductors 2Y, 2M, 2C, and 2K for transferring yellow (Y), magenta (M), cyan (C), and black (K) developer images on the sheet.

Subsequently, the developers agitated by the mixers 4Y to 4K in developing devices are supplied by the developing rollers 3Y to 3K to the photoconductors 2Y to 2K on which the electrostatic latent images are formed as described above. Accordingly, the electrostatic latent images formed on the photoconductive surfaces of the photoconductors are developed.

The developer images formed on the photoconductors as described are transferred on a belt surface of the intermediate transfer belt 6 (commonly known as primary transfer), and the developer images carried as the intermediate transfer belt is rotated are transferred on the sheet carried from the registration roller 23 at the secondary transfer position T.

The developer images transferred on the sheet are heated and fixed onto the sheet by the fixing apparatus 7. The sheets onto which the developer images are heated and fixed are carried into a carriage path by a plurality of pairs of carrying rollers and sequentially discharged onto the discharge tray 8.

Figure 3:
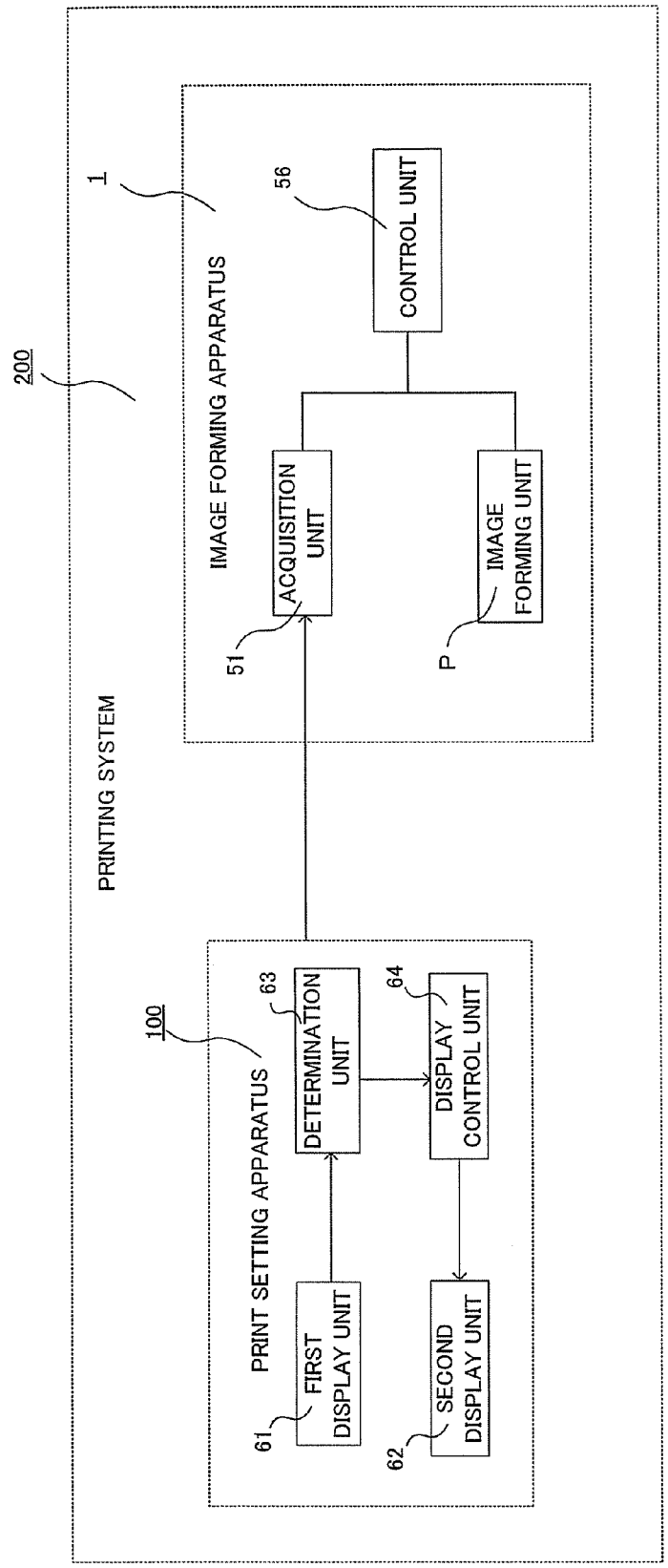
FIG. 3 is a function block diagram of the printing system.

Thereafter, an example of a function block of the printing system according to this embodiment is illustrated in FIG. 3. The print setting apparatus 100 includes a first display unit 61, a second display unit 62, a determination unit 63, and a display control unit 64. The first display unit 61 displays a first selection screen to select sizes of a sheet on which an image is to be printed. The selected sizes of the sheet may include a first size of which an aspect ratio of a sheet is 1:1.41 and a second size having an aspect ratio different from 1:1.41. In addition, square root of 2 is represented by 1.41, and in this specification, is simply denoted by 1.41. The first size corresponds to A series sheets such as A3 and A4 and B series sheets such as B3. The second size corresponds to "letter" size and "legal" size. The first display unit 61 may be the display screen 72.

The determination unit 63 determines whether or not the size of the sheet selected using the first display unit 61 is the first size. The determination unit 63 may be the controller 73.

The second display unit 62 has a mode in which an image is split and enlarged to be printed on a plurality of sheets, and a second selection screen is displayed to select a split print mode from among a plurality of split print modes which are distinguished by number of sheets. That is, the split print mode to be executed by the image forming apparatus 1 is selected via the second display unit 62. The plurality of split print modes displayed on the second display unit 62 may include a 1×2 mode (a first split print mode) in which image data is enlarged and printed on two sheets, a 2×2 mode in which image data is enlarged and printed on four sheets, a 3×3 mode in which image data is enlarged and printed on nine sheets, and a 4×4 mode in which image data is enlarged and printed on sixteen sheets. Here, the 1×2 mode is not displayed as the split print mode if the size of the sheet selected via the first display unit 61 is the second size. Here, "not displayed as the split print mode" includes a case where a display itself of the selection screen to select the 1×2 mode is prohibited and a case where the mode is formally displayed and the selection thereof is prohibited. The second display unit 62 may be the display screen 72.

The display control unit 64 displays, if the sheet selected via the first display unit 61 has the first size, the second selection screen including the selection screen to select the 1×2 mode on the second display unit 62. The display control unit 64, if the sheet selected via the first display unit 61 has the second size, displays the second selection screen without the selection screen to select the 1×2 mode included on the second display unit 62. The display control unit 64 may be the controller 73.

The image forming apparatus 1 includes an acquisition unit 51, the image forming unit P, and a control unit 56. The acquisition unit 51 acquires size information regarding a sheet on which an image is to be formed and print data from the print setting apparatus 100. The acquisition unit 51 acquires other print setting information than the size information and print data from the print setting apparatus 100. The other print setting information may include mode information regarding a case where split printing is performed, and print copy information. The acquisition unit 51 may be the communication unit 807.

The control unit 56 controls the image forming unit P on the basis of the print data and the print setting information acquired by the acquisition unit 51 to perform printing. If the size information transmitted from the print setting apparatus 100 indicates the first size and the mode information indicates the 1×2 mode, the control unit 56 controls the image forming unit P so that the vertical and horizontal directions of the image to be formed on the sheet are exchanged with respect to the print data and thus the image is enlarged to be printed on the two sheets.

Figure 4:
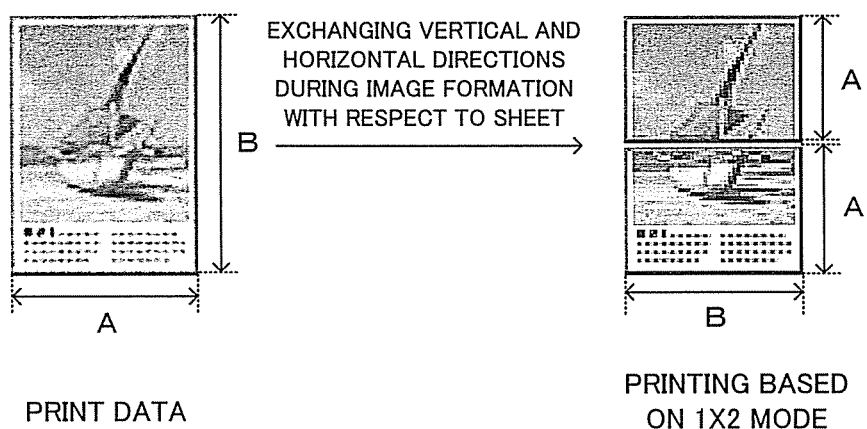
FIG. 4 is an explanatory view of an operation of exchanging vertical and horizontal directions during image formation.

Referring to FIG. 4, a direction in which the image is formed when printing based on the 1×2 mode is performed will be described. The print data represents that the horizontal size of the sheet is A, and the vertical size of the sheet is B. This kind of print data is changed when printing based on the 1×2 mode is performed so that the vertical and horizontal directions of the image formed on the sheets are exchanged with respect to the print data. That is, the two sheets on which the image is formed by enlargement printing are set so that the horizontal size is B and the vertical size is A. As such, by switching the vertical and horizontal directions for image formation, an enlarged image having a smaller magnification than that of the 2×2 mode can be obtained.

Figure 5:
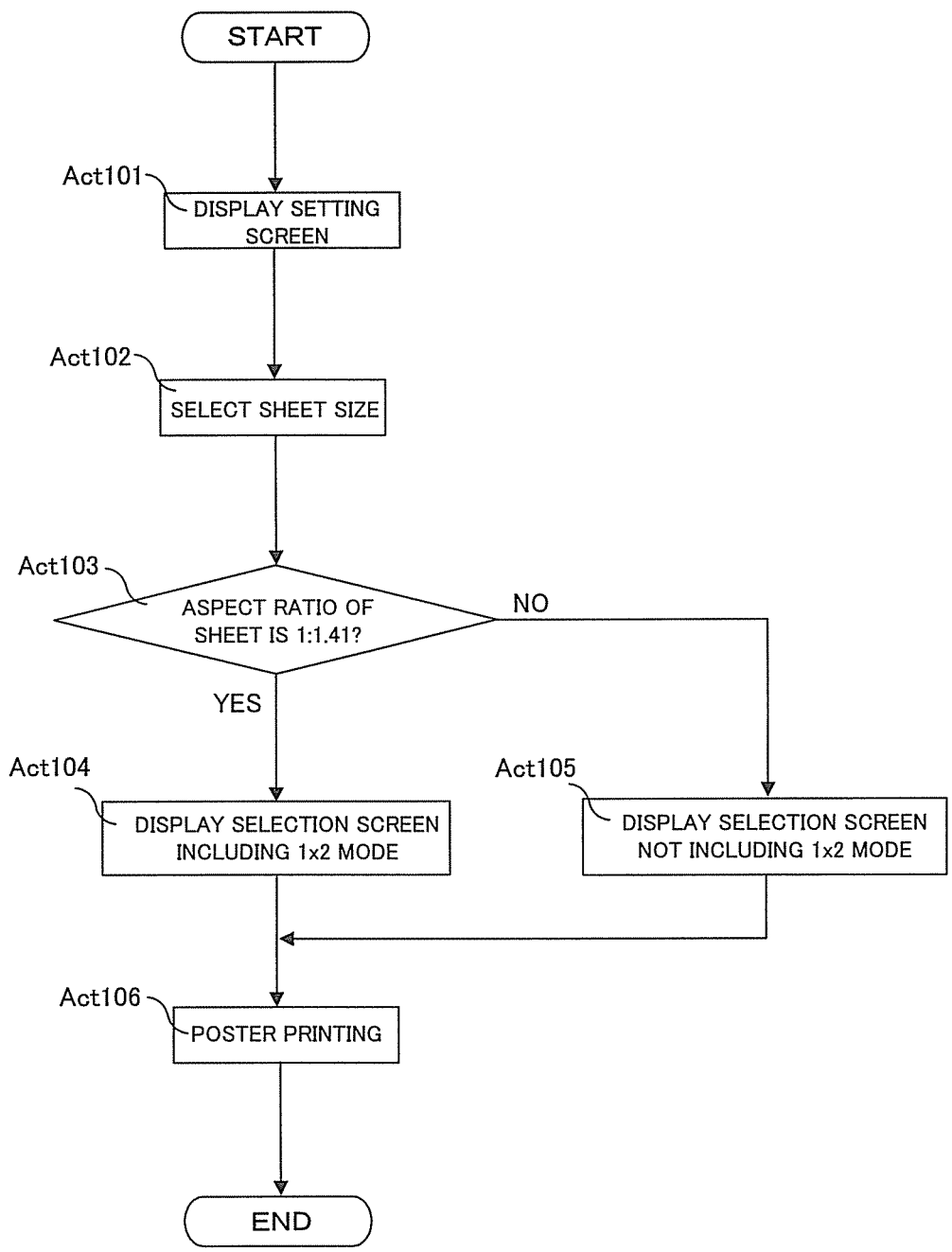
FIG. 5 is a flowchart showing the order of print settings performed by a print setting apparatus.
Figure 6:
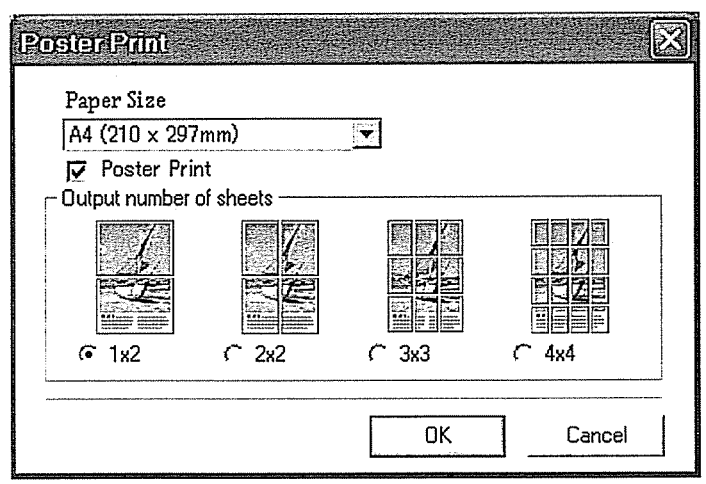
FIG. 6 shows an UI of the display screen if a sheet has a first size.
Figure 7:
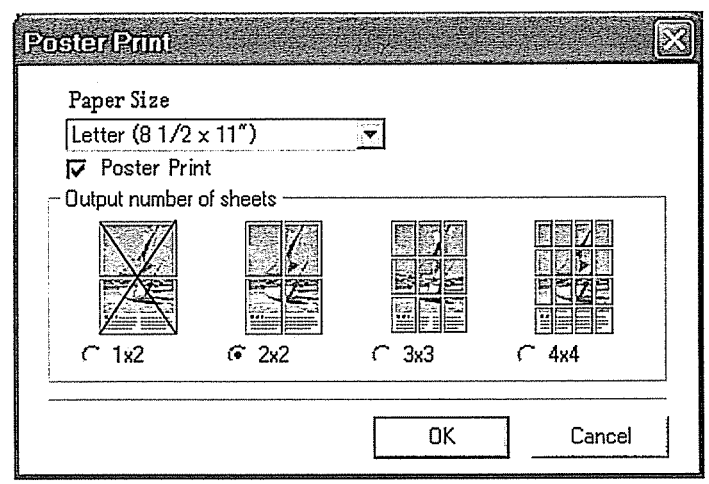
FIG. 7 shows an UI of the display screen if a sheet has a second size.

Next, a print setting method used in the print setting apparatus will be described with reference to FIGS. 5 to 7. FIG. 5 is a flowchart showing the order of print settings performed by the print setting apparatus. FIG. 6 shows an UI of the display screen 72 if the sheet has the first size. FIG. 7 shows an UI of the display screen 72 if the sheet has the second size.

In Act 101, the controller 73 displays a setting screen to perform print settings on the display screen 72. In Act 102, when a size of a sheet is selected, Act 103 is performed. In Act 103, the controller 73 determines whether the selected sheet corresponds to the first size or the second size. If the size of the sheet is the first size, that is, if the sheet has an aspect ratio of 1:1.41, Act 104 is performed, and if the sheet has an aspect ratio other than 1:1.41, Act 105 is performed.

In Act 104, the controller 73 displays the selection screen to select a split print mode from among the plurality of split print modes including the 1×2 mode on the display screen 72. Referring to FIG. 6, A4 size is selected as the size of the sheet according to this embodiment, and the 1×2 mode, the 2×2 mode, the 3×3 mode, and the 4×4 mode are displayed on the display screen 72 as the plurality of split print modes. In addition, the 1×2 mode is selected as the split print mode.

In Act 105, the controller 73 displays the selection screen to select a split print mode from among the plurality of split print modes without the 1×2 mode included on the display screen 72. Referring to FIG. 7, in this embodiment, "Letter" size is selected as the size of the sheet, and the 2×2 mode, the 3×3 mode, and the 4×4 mode are displayed as the plurality of split print modes on the display screen 72. In addition, the 2×2 mode is selected as the split print mode.

Here, by prohibiting printing based on the 1×2 mode, blanks that occur on the sheet when enlargement printing is performed can be reduced. That is, when split printing based on the 1×2 mode is performed using the sheet having the second size, unnecessary blanks occur on the left and right sides or on the upper and lower sides of the sheet. Therefore, by prohibiting the split printing based on the 1×2 mode, the generation of the blanks can be suppressed.

In Act 106, "Poster Print" displayed on the display screen 72 is selected, and when "OK" is selected, the print settings are completed.

Modified Example 1

In the embodiment described above, the first selection screen to select the size of the sheet on which the image is to be printed and the second selection screen to select the split print mode are displayed on a single display screen; however, they may be displayed on different displays screens. That is, after the size is selected on the first selection screen, the display of the display screen 72 may be switched to display the second selection screen.

Modified Example 2

In the embodiment described above, the setting of the sheet size and the split print mode is performed by the print setting apparatus 100. However, the functions of the print setting apparatus 100 may be incorporated into the image forming apparatus 1. In this case, the first and second display units 61 and 62 may be the operation display unit 805 of the image forming apparatus 1. The determination unit 63 and the display control unit 64 may be the controller 803 of the image forming apparatus 1.

While certain embodiments have been described, these embodiments have been presented by way of example only, and are not intended to limit the scope of invention. Indeed, the novel apparatus described herein may be embodied in a variety of other forms; furthermore, various omissions, substitutions and changes in the form of the apparatus described herein may be made without departing from the spirit of the inventions. The accompanying claims and their equivalents are intended to cover such forms or modifications as would fall within the scope and spirit of the inventions.

What is claimed is:

1. A print setting apparatus comprising:
a first display unit that displays a first selection screen to select an A4 size or a letter size as a size of a sheet on which an image is to be formed;
a determination unit that determines whether the size of the sheet selected using the first selection screen is A4 size or letter size;
a second display unit that displays a second selection screen to select any split print mode from among a plurality of the split print modes which are modes of splitting and enlarging a print image of which its size to be printed on a plurality of sheets and are distinguished by the number of sheets; and
a display control unit that, if the A4 size is selected displays the second selection screen including a selection screen to select one from among a 1×2 mode and a plurality of N×N modes (where N is an integer ≥2) on the second display unit, the 1×2 mode of enlarging the image to be printed on two sheets, the N×N mode of enlarging the image to be printed on N×N sheets, and the display control unit that, if the letter size is selected, displays the second selection screen to select one from among the plurality of N×N modes without the 1×2 mode, wherein a selected mode from among the 1×2 mode and the plurality of N×N modes is executed by controlling an image forming unit that forms the image on the sheet on the basis of the print data.

2. The apparatus according to claim 1, further comprising a transmitting unit that transmits size information regarding the sheet selected via the first selection screen and mode information regarding the split print mode selected via the second selection screen to an image forming apparatus along with the print data.

* * * * *